Patented Jan. 30, 1945

2,368,466

UNITED STATES PATENT OFFICE 2,368,466

PLYWOOD AND METHOD OF PREPARING THE SAME

Alexander J. Golick and Theodore W. Dike, Seattle, Wash., assignors to I. F. Laucks, Inc., Seattle, Wash.

No Drawing. Application September 9, 1941, Serial No. 410,212

6 Claims. (Cl. 20—89)

Our invention relates to the method of making an adhesive coating which is a synthetic resin derivative, and to the product thereof. It is to be understood that the invention is not restricted to any specific application.

One of the objects of the invention is to provide an inexpensive aqueous coating material which is easily applied and strongly adherent to wood and porous surfaces, is adapted to provide an antiseptic treatment and at the same time serve as an undercoater for finishing coats of oil paint or varnish.

Another object of the invention is to obtain a spreadable coating which will serve as an adhesive suitable for the hot press gluing of plywood, and it is therefore desirable that the adhesive be thermosetting. Moreover, it is desirable that the adhesive be of such quick setting character that an effective bond is formed much more promptly than heretofore without the use of such high temperatures and extended duration of hot pressing as to result in objectionable drying out or embrittlement destruction to the original resilient character of the wood as well as restricted output of the hot press.

Another important object of the invention is to make possible the manufacture of plywood which is weather resistant and therefore suitable for exterior use. An acceptable standard of weather resistance is embodied in the "Standards for Exterior Plywood" as adopted by the Douglas Fir Plywood Association of Tacoma, Washington.

Other desiderata of adhesives which are to be employed in the manufacture of plywood are that they be extremely cohesive after hot pressing but lacking in tackiness and cohesiveness at the time of application to the wood; that they have at least sufficient spreadability to be applied to veneer with regular roll type glue spreaders; and that the liquid glue, before application, retain its viscosity, homogeneity and other properties over a sufficient period of time to permit its economical use under operating conditions normally encountered in the plywood industry.

Numerous attempts have been made to obtain an adhesive which will have the above mentioned attributes, but heretofore it has not been possible to manufacture plywood having the desired weather resistance when using glues made from proteinous materials and therefore the industry has been forced to resort to the use of the so-called straight phenolic resin glues. These glues have the necessary weather resistance, but the additional processing operations, relatively restricted press output, and the additional labor which is required in their application have resulted in a very marked differential in price between plywood which is suitable for exterior use and plywood made from proteinous materials suitable for interior use. By virtue of the present invention, it is now possible to manufacture plywood from glue which has the advantages of the known proteinous adhesives and which, above all, is possessed of weather resistance at least equal to that of the phenolic resin adhesives now employed in the manufacture of exterior plywood.

The inventors have found that the desired potentially adhesive coating may be obtained by combining the initial potentially reactive condensation products of phenolic compounds and formaldehyde, hereinafter referred to as resin, with soluble blood albumen, in the manner hereinafter described, to obtain an aqueous suspension of what is evidently a reaction product, hereinafter referred to as a complex, which is in finely divided form and which possesses the new property for phenolic adhesives of being rapidly thermosetting at a relatively low temperature.

The mere addition of a phenolic resin to an aqueous dispersion of soluble blood albumen results in the formation of a solid, hard mass which has no particular utility and therefore the invention consists more particularly in the product resulting from the combination of soluble blood albumen and a phenolic resin when the combination is effected in the presence of an additional substance which results in the formation of an aqueous suspension of finely divided gel-like amorphous particles of the blood albumen-resin reaction product or complex.

To the acccomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

The following example is illustrative of the procedure which is preferably employed in making the adhesive coating, the proportions referred to being by weight:

EXAMPLE I

An emulsion of an initial phenol-aldehyde condensation product, in this instance a cresol-formaldehyde compound, is prepared by first adding 300 parts of 29% ammonium hydroxide slowly to 500 parts of formalin (37% aqueous solution of formaldehyde), the solution being cooled sufficiently to maintain it at room temperature. The use of these proportions of ammonium hydroxide and formalin will result in a solution having a pH of approximately 11.25. This solution is then added to a well stirred mixture composed of 500 parts of crude cresylic acid and 200 parts of casein, the pH of the cresylic acid-casein mixture being approximately 5.85. The whole mixture is vigorously stirred for approximately 30 minutes, and, as a result, a smooth, stringy emulsion of cresol-formaldehyde initial condensation product is formed which has a pH of approximately 8.90. There is no separation of any oily layer of phenolic condensation product and the emulsion remains smooth and homogeneous.

The reaction product of cresylic acid and aldehyde obtained at room temperature as just described is in contra-distinction to forming a further advanced and much more oily reaction product by heating as has been the practice in the prior art. That is to say, by stirring the ingredients together in the absence of heating the reaction product is apparently saligenin which is known to be hydrophylic in character to an extent such that there is no separating out into an oily layer of condensation product and an aqueous stratum. As is well known, saligenin itself is a crystalline compound but is so extremely reactive that a very small amount of heating changes it by polymerization to the more advanced resinous oily substance of the prior art, which we find to be objectionable.

Separately, 600 parts of soluble blood albumen are added to 500 parts of water and this is stirred for about 30 minutes, the pH being approximately 7.27. Then 100 parts of water and 400 parts of the phenolic condensation product emulsion, prepared as above described, are added to the blood albumen. Upon addition of the emulsion, the mixture immediately becomes exceedingly viscous and grainy, but on continued vigorous agitation or stirring, the viscosity drops and the mixture becomes fluid and quite smooth. 200 parts of water are then added and stirred into the mixture and the adhesive, which has a pH of approximately 8.30, is now ready for use.

All of the foresaid operations are carried out at room temperature.

By reason of the reaction of the formaldehyde of the resin emulsion with the casein, the latter is rendered insoluble on the glue line at the time the adhesive bond is completed as later described. It is to be noted that the adhesive is prepared without application of extraneous heat.

In accordance with the present invention due to the reactivity of the reaction product, which, as stated, we believe to be saligenin, it very easily combines with soluble blood albumen and the "complex" appears to be the reaction product of saligenin and blood albumen. This product seems to have a peculiar resinous character combining the extreme ease of heat conversion characteristic of blood albumen with the extreme durability in the converted state which characterizes a phenolic resin. Some casein may possibly enter into the reaction but, owing to the greater water solubility of blood albumen, the reaction is mostly with the blood. The leaching test mentioned hereafter in this specification where the presence of casein is detected in the filtrate but not the presence of blood is strong confirmation of this condition.

We wish to emphasize that the complex so formed is distinguished from glues heretofore available which included a phenolic resin in that it is (1) extremely quick setting when heated, (2) is quick setting at a low temperature, and (3) is quick setting at a low temperature effective to avoid injury to the wood from the pressing treatment. Thus, for the first time, the disadvantages of the use of conventional phenolic resin glues are effectively overcome. We believe this is due to the fact that the blood element is present predominantly and at the same time a sufficient amount of a phenolic element is present to obtain the phenolic characteristic of durability. This durability is of a high order as regards both water resistance and resistance to bacterial destruction.

Hitherto, those glues which have depended predominantly on a protein content for their durability, for example: blood glues, have had certain limitations. For example, hot pressed blood glue bonds have indeed been notable for high water resistance but their predominantly nitrogenous character has made them subject to ultimate destruction by slow bacterial attack. Such blood glues, however, have been exceptionally quick setting, and, furthermore, the quick setting character is obtained at a temperature not exceeding, for instance, about 250° F., which is low enough to avoid injury to the wood by heat embrittlement. On the other hand, phenolic resin glues have been notable for a unique combination of extraordinary water resistance and complete immunity from bacterial attack, but unfortunately in the hot press they have been decidedly slow setting and, still worse, their conversion has required treatment at temperatures normally between 275 and 325° F. which has entailed embrittlement destruction to the original resilient character of the wood by the long continued, intense heating. Perhaps the most striking benefit obtained by the present invention is that the advantages of both types of glue are, for the first time, combined without the disadvantages of either one, that is: the present glue sets quickly at low temperature and yet it retains the full durability of the pure phenolic resin glue. Thus our discovery of the good properties of a glue made by the cooperation between a large amount of soluble blood albumen modified by a minor amount of a phenolic condensation product and by control of pH slightly on the alkaline side has proved of great practical advantage in industry in that the desirable properties of phenolic resins as adhesives are made available without the insuperable objections heretofore encountered.

The maintenance of the hydrogen ion concentration within prescribed limits, to be mentioned below, is quite important. It is apparent that the hydrogen ion concentration of the formalin-ammonium hydroxide solution controls the degree of alkalinity which is noted during the subsequent procedure and in the final product, since the ammonium hydroxide is the only base which is added, and the hydrogen ion concentration of the other materials is fixed. As the mixing progresses, the pH at each stage is slightly lower than at the preceding stage, due to partial neutralization and dilution of the ammonium hydroxide as the various ingredients are added.

Although it is preferred that the formalin ammonium hydroxide solution have a pH of approximately 11.25, this may be as low as 10.50, or as high as 12.00. Accordingly, the pH of the emulsion which is preferably about 8.90 may vary between 8.50 and 10.00, and the pH of the final adhesive product may be from about 7.75 to 9.00, although it is preferably about 8.30.

If the pH of the formalin-ammonium hydroxide solution is below 10.50 as the result of using less ammonia, the glue will be extremely gritty and bright red in color and the adhesion will be seriously impaired. On the other hand, if the pH of the phenolic condensation product emulsion is above 12.00 as the result of using an excess of ammonia, the glue will be dark and oily, and the water requirement of the glue for a given viscosity will be much increased. When properly made, the glue has a strong phenolic odor and a reddish brown color. The glue is quite fluid and is composed of finely precipitated particles of blood albumen-phenol-aldehyde complex which no longer possesses the well-known properties of soluble blood albumen and far exceeds the thermal reactivity of the equivalent phenolic resin. The practical working life of the glue is about three to four weeks, during which time a very slow thickening takes place. Although the glue becomes strongly adhesive when subjected to heat and pressure, it is not especially cohesive or tacky when prepared. Provided that the hydrogen ion concentration is controlled within the limits referred to above, the amount of cresylic acid used may vary from about 200 to about 1000 parts in the foregoing example. Other phenols and aldehydes may be used but the low cost of cresylic acid and formalin makes their use preferable under present conditions. However, the use of relatively small quantities of cresylic acid results in shorter life of the glue, while relatively large quantities cause shallow penetration at the glue line.

The proportion of casein which is used may also vary widely, for instance, from about 50 to 500 parts in the foregoing example, but approximately 200 parts of casein are preferred from the standpoint of the uniformity and stability of the glue. Restricted amounts of casein result in poor consistency and spreadability and relatively high amounts produce an excessively heavy emulsion and unduly increase the cost of the glue.

The ratio of emulsion to blood albumen may likewise be varied very widely from about 50 to 800 parts of emulsion to 600 parts of blood albumen. It is noted that even with 800 parts of emulsion containing about 520 parts of active ingredients other than water, the blood content of 600 parts is still the predominant element. However, the optimum spreadability and stability result from the use of about 400 parts of the emulsion to 600 parts of the blood albumen. These proportions give a ratio of about 70% blood to 30% of other active ingredients.

The final dilution of the glue with water is controlled to give the desired viscosity and life to the glue; the low viscosity indicated resulting in longer life, less thixotropy, and better working characteristics.

As stated above, the adhesive coating of the present invention is especially suited for rapid hot press gluing of exterior fir plywood, but is not restricted to any one particular field since satisfactory results are obtained on many other species of wood and the glue may also be used for purposes other than the manufacture of plywood, for example, as a base for the preparation of coating materials.

In the manufacture of plywood, the adhesive is preferably applied at the rate of 60 to 75 pounds per thousand square feet of double glue line (three ply board). The moisture content of the material to be glued is not critical and may range, for example, from approximately 1% to approximately 20%. The panels may be hot pressed at any time up to 20 minutes after application of the glues. The bonding pressure used is limited by the ease of densification of the species of wood being laminated, usually ranging from 150 to 200 pounds per square inch. The press-plate temperature may vary from about 200° F. to about 250° F., depending upon the thickness and construction of the panel and moisture content of the plies. The time during which the panel is subjected to heat and pressure may range from four minutes for two three-sixteenth inch panels, pressed simultaneously, per opening up to eight minutes for a single one inch panel per opening. This is less than half the usual pressing time for phenolic resin panels and it is noted that the pressing temperature required for the latter, in spite of the longer time, is about fifty degrees higher. It is thus seen that our mild, fast press treatment both avoids wood embrittlement and attains a great increase in press output.

The weather resistance of the plywood made as described above is indicated by the fact that it passes the published "Standards for Exterior Plywood," which have been adopted by the Douglas Fir Plywood Association of Tacoma, Washington.

Test for exterior type

Five samples shall be cut from each test piece. They shall be submerged in water at room temperature for a period of 48 hours and dried for 8 hours at a temperature of 145° F. (±5° F.) and then followed by 2 cycles of soaking for 16 hours and drying for 8 hours under the conditions described above. The samples shall again be soaked for a period of 16 hours and tested, while wet, in a shear testing machine, by placing them in the jaws of the device to which a load shall be applied at the rate of 600 to 1000 pounds per minute until failure. The test specimens must show no less than 30 per cent minimum and 60 per cent average wood failure, and no delamination. If the number of plies exceeds three, the cuts shall be made so as to test any two of the joints, but the additional plies need not be stripped, except as demanded by the limitations of the width of the retaining jaws on the testing machines. When desired, special jaws may be constructed to accommodate the thicker plywood. If number of plies exceeds three, the choice of joints to be tested shall be left to the discretion of the inspector, but at least one-half the tests shall include the innermost joints.

Alternate test for exterior type

An alternate test applicable at the manufacturer's option to the one mentioned above consists in taking the samples as described above and boiling them in water for 4 hours, followed by a drying of 20 hours at the above mentioned temperature. They shall be boiled again for a period of 4 hours and the samples tested while wet as above described. The test specimens must show no less than 30 per cent minimum and 60 per cent average wood failure and no delamination.

These tests are of a rigorous character and involve alternately submerging the plywood in water for considerable periods, drying the plywood under prescribed conditions of temperature and then making shear tests of the treated specimens. Moreover, the adhesive described above has been subjected to bacteriological tests and it has been found to inhibit the growth of bacteria and fungi, and this property, of course, contributes to the weather resistance of products employing the adhesive.

Besides the aforementioned routine accelerated test for exterior plywood, we have also made long term exposure tests to determine the relative merit of our glue as compared to pure phenolic resin adhesives under practical working conditions. The tests consisted in exposing to the weather large sections of a considerable number of commercial plywood panels made both with the glue of the present invention and with a pure phenolic resin adhesive. The panels were exposed on the roof of a building in the severe climate of Seattle, Washington for thirty-two months. Before exposure, companion pieces of the same panels were tested for dry shear strength and wood failure and also for shear strength and wood failure after the aforementioned alternate boiling test for exterior plywood. After thirty-two months of exposure, both sets of tests were repeated and the following results were obtained.

*Dry shear tests*

|  | Original results | | Results after 32 months exposure | |
| --- | --- | --- | --- | --- |
|  | Shear value | Wood failure | Shear value | Wood failure |
| Glue of present invention | Pounds 258 | Per cent 95 | Pounds 204 | Per cent 62 |
| Pure phenolic resin glue | 211 | 87 | 136 | 72 |

*Alternate boil shear test*

|  | Original results | | Results after 32 months exposure | |
| --- | --- | --- | --- | --- |
|  | Shear value | Wood failure | Shear value | Wood failure |
| Glue of present invention | Pounds 208 | Per cent 49 | Pounds 163 | Per cent 52 |
| Pure phenolic resin glue | 155 | 55 | 110 | 67 |

It is noted that the shear values of the pure phenolic resin glue panels were consistently considerably lower than the shear values of the panels made with the glue of the present invention, the difference running from 18 to 35%. This difference, we believe, indicates injury to the wood by heat embrittlement which appears characteristic of the long time, high temperature pressing required in making phenolic resin plywood. On the other hand, the great durability of all the bonds is indicated by the wood failure, which with both glues was originally at a high level and remained at a high level after the long exposure either with or without the additional drastic treatment involved in the alternate boil test.

It is thus seen that practical weathering tests over a long period fully confirm the results obtained by the Fir Plywood Association's accelerated tests and indicate that the glue of the present invention not only attains the remarkable durability of the pure phenolic resin adhesives but also avoids the handicap of loss of original resilient character or wood embrittlement due to process heating. As far as we are aware, this is the first time that it has been possible to make plywood of exterior grade without the handicaps of low press output due to long pressing schedule and loss of original resilient fiber strength from heat.

In the above example, the casein dispersion serves as an emulsifying agent to reduce the phenolic condensation product to such a small, widely separated, particle size that when the reaction of the condensation product with the blood albumen takes place, the formation of large lumps is prevented. Instead, the albumen-phenol-aldehyde complex is precipitated in a finely divided form suitable for application and use like most other adhesives and possessing a practical degree of stability.

The particles of blood albumen-phenol-aldehyde complex which are formed in accordance with the above process are referred to herein as being finely divided. By the expression "finely divided" we mean particles most of which are not visible to the unaided eye but which are, for the most part, easily discernible when observed through a microscope having 10X objective and a 10X ocular. It is estimated that the major proportion of the particles in the preferred adhesive will be between .0001 and .002 inch in diameter, although, obviously some of the particles may be slightly larger and, under certain conditions of manufacture at least a portion of the particles may be colloidal in size.

That these particles consist of a blood albumen-phenol-aldehyde complex or reaction product, as distinguished from a mere mixture of individual particles of condensation product and blood albumen, is indicated not only by the various properties of the resulting glue, but also by the following tests.

Twenty grams of the herein described adhesive, manufactured commercially, were washed with 1000 cc. of water on a five inch No. 2 filter paper. The result was that practically no particles of blood albumen passed through the filter and the filtrate was almost colorless, having only a slight reddish tint. There remained on the paper a layer of finely divided, gel-like, amorphous particles.

To compare soluble blood albumen in aqueous suspension at the same pH, twenty grams of blood albumen were dissolved in 200 cc. of water and the pH was raised to 8.29 (the pH of the commercially produced adhesive) with trisodium phosphate. The solution was filtered and washed with 1000 cc. of water on a five inch No. 2 filter paper. As a result, a very small amount, not more than 2%, of residue remained on the paper and the filtrate retained its original blood red color. Photomicrographs taken of the moist filter paper showed only a few widely separated, undissolved blood particles retained on the paper.

It is believed that the finely divided particles are the reaction product of blood albumen and a phenol-aldehyde product when the latter is in its initial stages of condensation, and that the conversion of the condensation product under the influence of heat and pressure at the glue line is accelerated by the combined blood albumen. However, we do not regard the invention as being limited to the product of a typical or definitely identifiable chemical reaction, and we therefore prefer to term the product a blood albumen-phenol-aldehyde complex, by which term we mean that it is the product of either a definite chemical reaction or of some combination which is possibly in the nature of a condensation, the essential feature being that the blood albumen, and condensation product prepared as described above, are bound together in some way which is quite distinct from a mere mixture of finely divided particles. This result is indicated by the fact that both the blood and the phenolic condensation product seem to have lost their original identity and characteristic properties and the product exhibits new and unexpected characteristics.

It is probable that the casein which is used in the above described examples does not perform any essential function in the final adhesive and it may be noted that the presence of casein is detectable in the filtrate which results from washing the final product with water. The fact may also be noted that the casein is dispersed in the emulsion which has a pH of approximately 8.90 and remains dispersed in the finished glue wherein the pH is approximately 8.30. It is therefore apparent that the hydrogen ion concentration, which has a critical effect on the formation of the blood albumen-phenol-aldehyde complex does not have a like effect on the casein dispersion.

Upon a consideration of the function of the casein in the process of making the adhesive, it will be apparent that substitutes for casein may be employed in forming the condensation product emulsion, and we have found that either animal glue or gelatinized starch gives apparently satisfactory results as far as the physical character of the adhesive as prepared is concerned when substituted for casein, although casein is preferred from the standpoint of the durability of the resulting bonds. Obviously, the emulsifying agent must be of such a nature that it is rendered insoluble on the glue line at the time the bond is completed by reaction of the emulsifying agent with the formaldehyde of the resin emulsion, since otherwise the water resistance would be lowered in proportion to the amount of emulsifying agent used. The well-known low water resistance of both animal glue and starch prohibits their use when the maximum water and weather resistance is desired as is usually the case.

When the adhesive coating is applied to the stock which is to be glued, and subjected to heat and pressure in a hot press, the blood albumen-phenol-aldehyde complex, which is in a relatively fine, gel-like, amorphous particle form, is fused into a homogeneous and strongly adhesive film. Apparently, also a certain amount of free phenolic compound is liberated in the final conversion, which is absorbed by the wood and serves a useful function in extending antiseptic and bactericidal properties from the glue line itself to the adjacent wood. At any rate, tests of the commercial adhesive have shown inability to develop bacterial or fungus growth experimentally in a considerable band of wood adjacent to the glue lines, and in thin panels this bond may include the entire panel structure.

The most important effect of the application of heat and pressure is, of course, to bring about a conversion of the phenol-aldehyde-blood albumen complex or initial reaction product from a relatively non-tacky, non-cohesive substance to a strongly adhesive, water resistant, bonding material.

EXAMPLE II

The following example illustrates the use of this material as a highly weather resistant protective coating in the form of a priming coat for wood surfaces and the like. The ingredients are given by weight.

|  | Parts |
|---|---|
| Product of Example I | 100 |
| Rosin bodied China-wood oil | 10 |
| Drier | 0.15 |
| Water | 10 |

These ingredients are thoroughly mixed and form a very inexpensive aqueous emulsion paint which, besides being highly water resistant, owing to the presence of the phenolic element, protects the wood under weather exposure from mold and decay and at the same time forms a foundation for finishing coats of oil paint or varnish. The properties of this first coater may be modified in a variety of ways by addition of various resins, oils, pigments, etc. The peculiar properties of the product of Example I permit the ready emulsification and incorporation of a wide range of oily and resinous materials. The material brushes well and, of course, derives a considerable economy from being deposited from an aqueous medium instead of the usual oily vehicle. In some instances, the product of Example I may be used alone, but it is ordinarily preferable to incorporate a drying oil to improve the bond with subsequent coats of oil base materials. When this coating is dried, slow conversion takes place which in several days forms an insoluble weather resistant film which seems to have durability similar to the adhesive film obtained by hot press methods in a few minutes in plywood manufacture.

This application is a continuation-in-part of our co-pending application, Serial Number 350,112, filed August 2, 1940.

Other modes of applying the principle of the invention may be employed instead of these herein explained, changes being made as regards the details disclosed, provided the features stated in any of the following claims, or the equivalent of such, be employed.

We claim:

1. The method of making an adhesive which comprises forming a cresol-formaldehyde reaction product by adding an aqueous formalin-ammonium hydroxide solution having a pH of about 10.50 to 12 to cresylic acid and an emulsifying agent which is rendered insoluble on the glue line at the time an adhesive bond is completed by reaction with the formaldehyde of the resin emulsion, and agitating the mixture until an emulsion of a potentially reactive partially condensed cresol-formaldehyde resin is formed having a pH of about 8.50 to 10.00, adding to the emulsion an aqueous solution of soluble blood, and agitating the mixture until an aqueous smooth, fluid suspension of a thermo-setting resin-blood reaction product in finely divided state is formed having a pH between about 7.75 and 9.00, the method being carried out without application of extraneous heat.

2. An adhesive prepared by the method of claim 1.

3. Plywood having the layers united by the adhesive of claim 1.

4. The method of making an adhesive which comprises forming a cresol-formaldehyde reaction product by adding an aqueous formalin-ammonium hydroxide solution having a pH of about 10.50 to 12 to cresylic acid and an emulsifying agent which is rendered insoluble on the glue line at the time an adhesive bond is completed by reaction with the formaldehyde of the resin emulsion, and agitating the mixture until an emulsion of a potentially reactive partially condensed cresol-formaldehyde resin is formed having a pH of about 8.50 to 10.00, adding to the emulsion an aqueous solution of soluble blood, the soluble blood being in greater amount than said resin, and agitating the mixture until an aqueous smooth, fluid suspension of a thermosetting resin-blood reaction product in finely divided state is formed having a pH between about 7.75 and 9.00, the method being carried out without application of extraneous heat.

5. An adhesive prepared by the method of claim 4.

6. Plywood having the layers united by the adhesive of claim 4.

ALEXANDER J. GOLICK.
THEODORE W. DIKE.